(12) United States Patent
Takenoshita et al.

(10) Patent No.: US 8,586,670 B2
(45) Date of Patent: Nov. 19, 2013

(54) CHLOROPRENE POLYMER LATEX AND PROCESS FOR PRODUCING THE SAME

(75) Inventors: Youichiro Takenoshita, Kawasaki (JP); Noriko Ogawa, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 697 days.

(21) Appl. No.: 12/439,424

(22) PCT Filed: Aug. 30, 2007

(86) PCT No.: PCT/JP2007/066842
§ 371 (c)(1),
(2), (4) Date: Feb. 27, 2009

(87) PCT Pub. No.: WO2008/026671
PCT Pub. Date: Mar. 6, 2008

(65) Prior Publication Data
US 2010/0010136 A1  Jan. 14, 2010

(30) Foreign Application Priority Data

Aug. 31, 2006  (JP) ................................. 2006-235284

(51) Int. Cl.
| | |
|---|---|
| *C08L 11/02* | (2006.01) |
| *C08L 11/00* | (2006.01) |
| *C08L 9/10* | (2006.01) |
| *C08L 25/02* | (2006.01) |
| *C08L 9/00* | (2006.01) |
| *C08L 47/00* | (2006.01) |
| *C08F 214/02* | (2006.01) |
| *C08F 36/18* | (2006.01) |
| *C08F 136/18* | (2006.01) |

(52) U.S. Cl.
USPC ........... 524/834; 524/567; 524/571; 524/836; 526/335; 528/396; 528/397

(58) Field of Classification Search
USPC .................. 524/567, 571, 834, 836; 526/335; 528/396, 397
See application file for complete search history.

(56) References Cited

U.S. PATENT DOCUMENTS

| | | | | |
|---|---|---|---|---|
| 3,929,752 | A | * 12/1975 | Cooper et al. | ................. 526/217 |
| 3,939,138 | A | * 2/1976 | Suzuki et al. | ................. 530/225 |
| 5,332,771 | A | 7/1994 | Christell | |
| 5,773,544 | A | 6/1998 | Christell et al. | |
| 5,977,222 | A | 11/1999 | Wakayama et al. | |
| 6,525,132 | B1 * | 2/2003 | Oba et al. | ...................... 524/764 |
| 2003/0100665 | A1 | 5/2003 | Oba et al. | |

FOREIGN PATENT DOCUMENTS

| | | |
|---|---|---|
| EP | 0451998 A2 | 10/1991 |
| JP | 61-243813 A | 10/1986 |
| JP | 6-329728 A | 11/1994 |
| JP | 08-504228 A | 5/1996 |
| JP | 09-031429 A | 2/1997 |
| JP | 11-158327 A | 6/1999 |
| JP | 2000-319453 A | 11/2000 |
| JP | 2001064616 A | 3/2001 |
| JP | 2006-199932 A | 8/2006 |

OTHER PUBLICATIONS

Haruumi Asai, Gosei Gomu Gaisetsu, second edition, Asakura Shoten, Jun. 15, 1974, pp. 159-160.
Haruumi Asai, Gosei Gomu Gaisetsu, second edition, Asakura Shoten, Jun. 15, 1974, pp. 158-200.

* cited by examiner

*Primary Examiner* — Karuna P Reddy
(74) *Attorney, Agent, or Firm* — Sughrue Mion, PLLC

(57) ABSTRACT

A latex of a chloroprene polymer formed from one or more monomers comprising 2-chloro-1,3-butadiene as the main monomer ingredient, characterized in that the solid matter in the polymer latex has a gel content less than 3 mass %, the solid matter in the polymer latex includes a tetrahydrofuran-soluble component having a weight-average molecular weight of from 550,000 to 1,100,000 and a molecular-weight distribution (Mw/Mn) of from 2.0 to 3.1, and the dried solid matter in the polymer latex has a crystallization rate (R) represented by hardness increase at −10° C. (R is the time required for initial hardness (time=0) to increase by 30 points at −10° C. as measured according to JIS-K6301) less than 60 minutes. The chloroprene polymer latex has an excellent balance among initial bond strength, contact adhesion, and water resistance. This latex is useful as an adhesive and can be used in applications where heat resistance of 60° C. or higher, initial bond strength, and contact adhesion are required.

11 Claims, No Drawings

CHLOROPRENE POLYMER LATEX AND PROCESS FOR PRODUCING THE SAME

TECHNICAL FIELD

The present invention relates to a latex of a chloroprene polymer (including a composition thereof) and a process for producing the same: i.e. a latex of a chloroprene polymer having improved initial bond strength and excellent contact adhesion and water resistance while maintaining having heat-resistant bond strength at 60° C. or higher; and a process for producing the same, for example, a latex of a chloroprene polymer which is suitable for use in bonding the adherends to each other, at least one of which is a flexible material, particularly for the furniture and construction materials, and for adhesives for the absorbing adherends to bond foams or a foam and a wood material to each other, which latex can be used in applications where a balance among excellent initial bond strength, contact adhesion and water resistance is required; and a process for producing the same.

BACKGROUND ART

Conventionally, a vinyl acetate polymer, a chloroprene polymer, an acrylic ester polymer, natural rubber, an urethane polymer and the like have been used as a polymer for adhesives. In particular, a chloroprene polymer has been suitably used for adhesives such as solvent type contact adhesives and graft adhesives since high bond strength can be obtained at low compression bonding for a wide variety of adherends. However, a regulation on volatile organic compound emissions and a solvent regulation have been called for years in consideration of the recent environmental pollution and the health of human beings. Aqueous adhesives using a chloroprene latex has been increasingly developed in order to meet these needs.

However, because of the strong desire for the bond performance, a problem of the aqueous adhesive has been pointed out regarding the bond strength lower than that of a conventional solvent type. Consequently, in order to meet the ever more sophisticated needs to improve the bond strength, particularly the initial bond strength, an adhesive having high crystallization rate and showing excellent initial bond strength in a short time is being developed. However, the initial tack in a bonding step at room temperature rather than heat resistance is more important for the product to be used (in service) at a relatively low temperature such as 60° C. or lower, for example, for the use of bonding cushions, fabrics and cloths in the field of furniture and construction materials. That is, despite the importance of the initial tack with slight contact pressure, the adhesive using a chloroprene latex has not adequately fulfilled the expectations. At the same time, water-resistant property is important as well.

In particular, in the bonding of the adherends (substrates) such as foam, the contact adhesion is extremely important because it is necessary to attain the initial bond strength in a short time with slight contact pressure such that the substrate would not be damaged (deformed/destroyed). A technique of using a tackifier agent with a low-melting point may be employed so as to increase the initial tack, however, in this case, a problem of the lowered adhesion arises due to the cohesion peculiar to a chloroprene polymer. Also, though a spray coating is often employed to facilitate and to save labor of applying an adhesive, the use of the compounding agent in a large amount tends to cause nozzle clogging of the spray due to the precipitation of the solid compounding agent, which leads to a processing problem. For these reasons, there is a growing need of the adhesive for being excellent in the initial tack (contact adhesion) and water-resistant property while maintaining the heat-resistance and the bond strength by the chloroprene latex itself.

The conventional chloroprene polymer latex has had a problem that it failed to achieve a good balance among excellent initial bond strength, initial tack and water resistance.

The examples of the prior art relating to the chloroprene polymer latex include JP-A-H08-504228 (U.S. Pat. No. 5,332,771). However, the latex cannot be expected to attain high initial bond strength because it is a copolymer of chloroprene and 2,3-dichlorobutadiene of at least 2 mass % and therefore cannot attain a desired cohesion due to a low crystallization rate. JP-A-H09-31429 (U.S. Pat. No. 5,977,222) as a second example does not have a description of the crystallization of the chloroprene latex or the polymerization temperature and does not necessarily attain the high initial bond strength. In the case of JP-A-H11-158327 (U.S. Pat. 6,525,132) as a third example, the invention defines that the content of the gel (crosslinking component) in the polymer is 3 to 40 mass %, and therefore, while the sufficient heat resistance is attained, it is difficult to say that the sufficient initial tack and the water-resistant property are achieved due to an excessive amount of the gel. or the polymerization temperature and does not necessarily attain the high initial bond strength. In the case of JP-A-H11-158327 (U.S. Pat. No. 6,525,132) as a third example, the invention defines that the content of the gel (crosslinking component) in the polymer is 3 to 40 mass %, and therefore, while the sufficient heat resistance is attained, it is difficult to say that the sufficient initial tack and the water-resistant property are achieved due to an excessive amount of the gel.

The conventional technology relating to the above-mentioned chloroprene polymer latex has a problem in achieving a balance among the initial bond strength, contact adhesion and water resistance, while a high-level heat resistance: e.g. the resistance at 80° C. or higher is ensured. That is, the conventional chloroprene polymer latex has a problem of the insufficient initial tack (contact adhesion) for use in an aqueous adhesive.

Patent Document 1: JP-A-H08-504228
Patent Document 2: JP-A-H09-31429
Patent Document 3: JP-A-H11-158327

PROBLEMS TO BE SOLVED BY THE INVENTION

The present invention provides a chloroprene being excellent in the initial tack (contact adhesion) and achieving an excellent balance with the initial bond strength and water-resistance.

MEANS TO SOLVE THE PROBLEM

As a result of intensive study to solve the above-mentioned problem, the present inventors have found that the problem can be solved by a specific chloroprene polymer latex.

That is, the present invention includes the following latex of a chloroprene polymer and the embodiment of a process for producing the same:

1. A chloroprene polymer latex mainly comprising 2-chloro-1,3-butadiene as a monomer component, wherein the gel content in the solid of the polymer latex is less than 3 mass %; and the weight average molecular weight of the components soluble in tetrahydrofuran is from 550,000 to 1,100,000 and the molecular weight distribution (Mw/Mn) is within the range of from 2.0 to 3.1; and the crystallization rate represented by R is less than 60 minutes, wherein R indicates the hardness increase of the dried solid content of the polymer latex at −10° C. (R is the time required for initial hardness (time=0) to increase by 30 points at −10° C. as measured according to Japanese Industrial Standard JIS K-6301).

2. The chloroprene polymer latex as described in 1 above, containing an anionic emulsifying agent in the pH range of from 10 to 13.5.

3. The chloroprene polymer latex as described in 1 or 2 above, further containing an acid acceptor of 0.01 to 5 parts by mass and an antioxidant of 0.1 to 3 parts by mass to 100 parts by mass of the solid content of the chloroprene polymer latex.

4. The chloroprene polymer latex as described in 3 above, wherein the antioxidant is a phenol antioxidant.

5. The chloroprene polymer latex as described in 3 or 4 above, wherein the acid acceptor is zinc oxide or hydrotalcite and the antioxidant is hindered phenol.

6. The chloroprene polymer latex as described in any one of 1 to 5 above, wherein the open time is two hours or more, the initial bond strength is 3 kN/m or more and the heat-resistance of 60° C. or higher.

7. An adhesive characterized in comprising the chloroprene polymer latex described in any one of 1 to 6 above.

8. The adhesive as described in 7 above for water-absorbing adherends.

9. A process for producing a chloroprene polymer latex mainly comprising 2-chloro-1,3-butadiene as a monomer component, characterized in that the polymerization is performed at a temperature from 0 to 30° C. so as to adjust the gel content in the solid content of the polymer latex to less than 3 mass %, the weight average molecular weight of the components soluble in tetrahydrofuran to a range from 550,000 to 1,100,000 and the molecular weight distribution (Mw/Mn) to the range of from 2.0 to 3.1.

10. The process for producing the chloroprene polymer latex as described in 9 above, wherein the polymerization is an emulsion polymerization.

11. The process for producing the chloroprene polymer latex as described in 9 or 10 above, wherein the polymerization is performed at a polymerization conversion of from 65% and less than 80%.

EFFECTS OF THE INVENTION

The present invention enables significant improvement in the initial tack that cannot be achieved in the conventional technology by keeping the gel content in the polymer as low as possible and maintaining a particularly narrow molecular weight distribution while satisfying the demanded initial bond strength. Thus, present invention is characterized in an excellent balance among initial bond strength, initial tack and water resistance while maintaining the heat-resistance of 60° C. or higher, which is different from the conventional technology. According to the present invention, an excellent balance among initial bond strength, initial tack and water resistance can be attained without using a particular tackifier. Also, in the present invention, the stretch of the adhesion layer can be improved at the same time owing to the narrow molecular weight distribution of the polymer. This allows the adhesion layer to stretch after bonding a flexible adherend with an adhesive in a semiarid condition after application and to keep pace with the change in shape of the adherend to thereby enable to prevent the adherend from destruction as well as to maintain stable adherence property without being peeled off.

BEST MODE TO CARRY OUT THE INVENTION

As a process for producing the chloroprene polymer of the invention, emulsion polymerization can be employed. Particularly, aqueous emulsion polymerization can be used industrially. Also, as a method for polymerization of the chloroprene polymer of the present invention, solution polymerization and suspension polymerization other than emulsion polymerization can be performed at a temperature similar to that of the emulsion polymerization.

As an emulsifier in the emulsion polymerization method, an anionic emulsifier is preferable. Particularly, using potassium salt or sodium salt of rosin acid or a combination thereof is preferable in view of easiness in the stabilization of the colloidal state and destabilization for forming an adhesion layer. The potassium salt or sodium salt of rosin acid or a combination thereof is stable in the pH range of from 10 to 13.5. When the pH value is lower than 10, the colloidal particles are destabilized and aggregate, failing to form an even adhesion layer, which is likely to deteriorate the adherence property. When the pH value exceeds 13.5, it increases the ionic strength, which tends to cause aggregation between colloidal particles.

The emulsifier usage is preferable from 1 to 8 parts by mass to 100 parts by mass of the monomer, more preferably, from 2 to 5 parts by mass. When the usage is less than 1 part by mass, it is likely to lead to a defective emulsion and to give rise to a problem such as a less control of the polymerization heat, generation of aggregates and defective appearance of the product. When the usage exceeds 8 parts by mass, it leads to degradation of the water-resistance of the polymer due to the residual emulsifier, which may give rise to problems such as decrease in the bond strength, foam formation during the drying process and deterioration of the product shade.

Furthermore, an auxiliary emulsifier such as dodecylbenzene sulfonate including sodium dodecylbenzene sulfonate and dodecylbenzene sulfonatetriethanolamine; diphenylether sulfonate including sodium diphenylether sulfonate and diphenylether sulfonate ammonium salt; and naphthalene sulfonate including sodium salt of β-naphthalene sulfonate formaldehyde condensate may be used in combination. Also, a nonionic emulsifier such as polyoxyethylenenonylphenyl ether, polyoxyethyleneoctylphenyl ether and polyoxyethylenelauryl ether may be used in combination.

The usage of these auxiliary emulsifiers is preferably from 0.05 to 1 part by mass to 100 parts by mass of the monomer, more preferably from 0.1 to 0.5 parts by mass. If the usage is less than 0.05 parts by mass, it is liable to cause incomplete dispersion, which may raise problems such as generation of the aggregates and defective appearance of the product. If the usage exceeds 1 part by mass, it leads to degradation of the water-resistance of the polymer due to the residual emulsifier, which may cause problems such as lowered initial tack and bond strength and foam formation during the drying process and deterioration of the product shade.

The polymer of the present invention basically comprises 100 mass % of 2-chloro-1,3-butadiene (chloroprene), but the other copolymerizable monomers such as 2,3-dichloro-1,3-butadiene, 1-chloro-1,3-butadiene, butadiene, isoprene, styrene, acrylonitrile, acrylic acid and ester thereof, ester of methacrylic acid may be used in an amount such that they do not interfere with the effects of the invention. Two or more of them may be used as needed. If the content of the other copolymerizable monomers is 2 mass % or more in the total amount of the monomers, it may deteriorate the initial bond strength and contact adhesion in some cases.

A chain transfer agent to adjust the molecular weight and the molecular weight distribution is not particularly limited, and dialkylxanthogendisulfide, alkylmercaptan and the like may be used. However, alkylmercaptan is preferable since dialkylxanthogendisulfide destabilizes the terminal of the polymer and becomes an active site in crosslinking, thereby making it difficult to control the molecular weight and the gel content.

Examples of dialkylxanthogendisulfide include diisopropylxanthogendisulfide, diethylxanthogendisulfide, dicyclohexylxanthogendisulfide, dilaurylxanthogendisulfide, and dibenzylxanthogendisulfide; and examples of alkylmercaptan include n-dodecylmercaptan, n-decylmercaptan and octylmercaptan. Two or more of chain transfer agents may be used in combination as long as they do not interfere with the effects of the present invention. Though the preferred additive amount of the chain transfer agent may differ depending on its kind and a desired polymerization conversion, for example, when n-dodecylmercaptan is used, the additive amount is preferably from 0.1 to 0.2 parts by mass to 100 parts by mass of the monomer.

The polymerization conversion of the polymer of the present invention is preferably from 65% to less than 80%, more preferably from 70% to 79%. The polymerization conversion of less than 65% may lower the solid content of the polymer latex, which not only puts a burden on the drying step after applying an adhesive and makes the uniform formation of the adhesive layer difficult but also causes problems such as the odor due to the residual monomer and deterioration of the initial tack and bond strength. If the polymerization conversion is 80% or more, it may increase branches in the polymer or molecular weight, thereby making a wider molecular-weight distribution which tends to exceed the maximum value of the molecular weight distribution as defined in the present invention, and may further cause a problem of deterioration of the contact adhesion and water-resistance, which are the critical features of the present invention. In view of this, adjusting the polymerization conversion is very important in the present invention. To control the polymerization conversion, the polymerization reaction is ceased by adding the polymerization terminator described below at the time when a desired conversion is achieved.

The polymerization temperature in the present invention is preferably within the range from 0 to 30° C., more preferably from 5 to 15° C. If the polymerization temperature is lower than 0° C., it might reduce productivity of the polymer, lead to insufficient contact adhesion or deteriorate the water-resistance. If the polymerization temperature exceeds 30° C., it may cause a problem of the insufficient initial bond strength.

In the present invention, the polymerization is performed so as to adjust the gel content in the solid content of the chloroprene polymer latex: i.e. the component insoluble in tetrahydrofuran to less than 3 mass %, preferably 2 mass % or less, still more preferably 1 mass % or less. When the gel content in the solid content of the chloroprene polymer latex is 3 mass % or more, it deteriorates the contact adhesion and the water resistance.

In the present invention, the polymerization is performed so as to make the weight average molecular weight of the tetrahydrofuran-soluble component in the solid content of the chloroprene polymer latex measured by GPC (gel permeation chromatography) from 550,000 to 1,100,000, preferably from 700,000 to 900,000. The weight average molecular weight less than 550,000 deteriorates the initial bond strength and the heat resistance. The weight average molecular weight exceeding 1,110,000 deteriorates the contact adhesion and water resistance.

In addition, in the present invention, the molecular weight distribution (Mw/Mn) of the tetrahydrofuran-soluble component in the solid content of the chloroprene polymer latex is preferably from 2.0 to 3.1, more preferably from 2.3 to 2.8. The molecular weight distribution less than 2.0 deteriorates the initial bond strength and heat resistance, while the distribution exceeding 3.1 increases the polymer having high molecular weight, thereby deteriorating the contact adhesion and water resistance. In the present invention, the control of the molecular weight and the molecular weight distribution of the chloroprene polymer latex is particularly effective in attaining good contact adhesion.

In the present invention, the crystallization rate represented by R is less than 60 minutes, wherein R indicates the hardness increase of the dried solid content of the polymer latex at $-10°$ C. (R is the time required for the hardness increase of 30 point from the initial hardness (time=0) measured at $-10°$ C. in the manner prescribed in Japanese Industrial Standard JIS K-6301). The crystallization rate of 60 minutes or more deteriorates the initial bond strength and heat resistance. The crystallization rate tends to decrease as the polymerization temperature rises and as the content of the polymerizable monomers increases. The desired crystallization rate as mentioned above can be attained by controlling the polymerization temperature to 30° C. or less. The content of the copolymerizable monomer is preferably 2 mass % or less as described previously.

As the polymerization initiator, an ordinary radical polymerization initiator can be used. For example, in the case of the emulsion polymerization, common organic or inorganic peroxide such as benzoyl peroxide, potassium persulfate and ammonium persulfate; and azo compound such as azobisisobutyronitrile can be used. Further, a promoter such as anthraquinone sulfonate, potassium sulfite and sodium sulfite can be used in combination as appropriate.

Generally, in the production of a chloroprene polymer, the polymerization reaction is ceased by adding a polymerization terminator at the time when a desired conversion is achieved in order to obtain a polymer having a desired molecular weight and molecular weight distribution. The polymerization terminator is not particularly limited, and a commonly used polymerization terminator such as phenothiazine, para-t-butylcatechol, hydroquinone, hydroquinone monomethylether and diethylhydroxylamine can be used.

Since a chloroprene polymer is generally susceptible to oxidation, it is preferable to use a stabilizer such as an acid receptor and an antioxidant as appropriate in the present invention in a range that they would not interfere with the effect of the invention.

By blending an acid receptor of from 0.01 to 5 parts by mass and an antioxidant of from 0.1 to 3 parts by mass to 100 parts by mass of the solid content of the polymer latex, a composition having improved temporal stability in terms of bond strength and heat resistance can be obtained. When using a water-insoluble material for the blend or destabilizing the colloidal state of the polymer latex, an aqueous dispersion is prepared in advance and then added to the polymer latex.

The acid receptor used in the present invention is not particularly limited and specific examples include zinc oxide and hydrotalcite (produced by Kyowa Chemical Industry Co., Ltd.; DHT-4A, DHT-6 and the like). Two or more of them can be used in combination. The additive amount of these acid receptors is preferably from 0.01 to 5 parts by mass, more preferably from 0.05 to 1 parts by mass to 100 parts by mass of the chloroprene polymer latex. With the additive amount of less than 0.01 parts by mass, eliminated hydrochloric acid cannot be fully neutralized. Meanwhile the additive amount exceeding 5 parts by mass deteriorates the initial tack and bond strength. It also reduces the colloidal stability of the polymer latex composition and tends to cause a problem such as sedimentation.

For use as an adhesive, change in color and the hygienic status of the sticking glue run off the edge (glue line) are often acknowledged as a problem and therefore a phenol antioxidant, particularly a hindered phenol antioxidant is preferably used as an antioxidant in the present invention. Examples of the antioxidant includes 2,2'-methylenebis(4-ethyl-6-tert-butylphenol), 2,2'-methylenebis(4-methyl-6-tert-butylphenol), 4,4'-butylidenebis(3-methyl-6-tert-butylphenol), a butylated reaction product of p-cresol and dicyclopentadiene. The additive amount of the antioxidant is preferably from 0.1 to 3 parts by mass to 100 parts by mass of the solid content of the chloroprene polymer latex, more preferably 0.5 to 2 parts by mass. The additive amount of less than 0.1 parts by mass cannot provide sufficient protection against oxidation while the additive amount exceeding 3 parts by mass may deteriorate the initial tack and bond strength.

In the present invention, the additives other than the above-mentioned acid receptor and antioxidant may be used as needed within a range such that the additives do not interfere with the effects of the present invention. That is, a filler, tackifier, pigment, coloring agent, moisturizer, defoamant, thickener and the like can be used as appropriate.

Examples of the water-absorbing adherend suitable for bonding in the present invention include foam comprising the material such as polyurethane, ethylene-vinyl acetate copolymer and polyethylene; a wood material, cloth and fabric.

The chloroprene polymer latex produced under the conditions as described above provides a balance among the initial bond strength, contact adhesion and water resistance and has excellent properties (the measurement method of each physical property is described in Examples) such as the initial bond strength of 3 kN/m or higher, open time of two hours or more, and even heat resistance at 60° C. or higher. Therefore it is useful for adhesives and the like.

EXAMPLES

Hereinafter, the present invention is described in further detail in reference to examples and comparative examples, but should not be construed as being limited thereto.
Production of a Latex Composition
A chloroprene polymer latex composition was produced in the compounding ratio as follows:

| Blend | Parts by dry mass |
|---|---|
| Chloroprene polymer latex | 100 |
| Zinc oxide *1) | 0.2 |
| Phenol antioxidant *2) | 2 |

*1) Produced by Osaki Chemical Co., Ltd.; AZ-SW (aqueous dispersion of zinc oxide)
*2) Produced by Chukyo Yushi Co., Ltd.; K-840 (aqueous dispersion of Wingstay L)

Production of Test Pieces
1) Test Piece for Measuring the Open Time
Onto the 100-square-millimeter square surface of polyurethane foam of 100×100×50 millimeter in size, a latex composition was applied using a spray gun in a layer of 100 to 120 g/m² and left standing at room temperature and 65% RH (relative humidity) for ten minutes.

2) Test Piece for a Bonding Test
A latex composition was applied onto cotton canvas to a thickness of from 100 to 200 μm using a brush and left standing at room temperature and 65% RH (relative humidity) for one hour. Then the test pieces were bonded to each other and pressed with one reciprocating pass of a 5 kg roller to be bonded by a pressure.
3) Test Piece for Measuring the Crystallization Rate
Using a bar coater, a latex composition was applied onto a polyester film (produced by Du Pont; Mylar (registered trademark)) to a thickness of from 100 to 200 μm after drying. After being dried at room temperature for one hour, the test piece was dried by heating at 70° C. for another one hour. A chloroprene polymer sheet having a thickness of from 4.5 to 5.5 mm was produced by repeating the above operation comprising the step of application to the step of drying. The sheet was used as a test sample for measuring the crystallization rate.

Using the above test samples, physical properties were evaluated as follows:
Measuring Method
Gel Content:
1 g of latex was delivered by drops into 100 ml of a THF (tetrahydrofuran) solvent. Subsequent to shaking for one night, the supernatant dissolved phase was separated by the centrifuge, and a solvent was evaporated at 100° C. over one hour to dryness to determine the dissolved amount. The dissolved amount was deducted to evaluate the gel content as the THF-insoluble component.
Molecular Weight:
The supernatant dissolved phase obtained in the measurement of the gel content was separated, diluted with THF and subjected to GPC (gel permeation chromatography) to determine the molecular weight in terms of polystyrene. The weight average molecular weight was evaluated.

Regarding the conditions for GPC measurement, a HP 1050 system produced by Yokokawa Analytical Systems was used with Shodex RI-71 (differential refractive index detector) as a detector and the column type PLgel 10 μm Mini-MIX-B at a column temperature of 40° C. and outlet velocity of 0.4 mL/min.
Crystallization Rate:
The hardness increase was measured. The crystallization rate R was evaluated by measuring the time required for the hardness increase by 30 point from the initial surface hardness (JIS-A) (at the time after drying to produce the above-mentioned test piece and immediately before the storage at −10° C.).

The surface hardness (JIS-A) was measured in the manner as prescribed in Japanese Industrial Standard JIS K-6301.
Open Time:
An indicator of the contact adhesion. The test pieces were pressed with fingers with time to be bonded to each other. The test piece was evaluated as being "able to adhere" if the pieces of the polyurethane foam are kept joined without being peeled when the fingers are released. The maximum lapse time for the test piece to keep the ability to adhere was defined as "open time".
Initial Bond Strength/Normal State Bond Strength:
The cotton canvas was selected as the adherend and subjected to T-type peel test in the manner as prescribed in JIS-K6854. The initial bond strength (kN/m; one hour after being bonding) and the normal state bond strength (kN/m; one week after bonding) were measured by this test.
Water-Resistant Bond Strength (Water Resistance):
The cotton canvas was selected as the adherend and subjected to T-type peel test in the manner as prescribed in JIS-K6854. The test piece was cured for one week after bonding and dipped in purified water for one day, and then the bond strength (kN/m) was measured.

Heat Resistance:

Using a test piece of the same size as the one used in the above tests of the bond strength, a hole was punched at both ends of the piece where the adhesive was not applied to hang the piece in a hot air drier with a 1 kilogram weight hung at a lower end. The piece was heated from 40 to 130° C. at a constant temperature rise rate of 20° C./hour. The temperature (0° C.) when the weight fell down was measured to determine the heat resistance (the temperature for achieving a steady state creep).

Example 1

Using a reactor having an inner volume of 60 liter, 20 kg of chloroprene, 20 g of n-dodecylmercaptan, 300 g of potassium rosinate, 50 g of sodium dodecylbenzenesulfonate, 19 kg of ion-exchange water, 200 g of potassium hydroxide and 20 g potassium sulfite were charged therein and emulsified, followed by polymerization under nitrogen atmosphere at 10° C. using potassium persulfate as a polymerization initiator. Immediately after a desired polymerization conversion (79%) was achieved, phenothiazine emulsion was added thereto to terminate the polymerization to thereby obtain a polymer latex.

The latex was subjected to steam distillation to remove the residual chloroprene monomer to thereby obtain a chloroprene polymer latex. The obtained latex was used for the subsequent evaluations.

Examples 2 to 5, Comparative Examples 1 to 5

The polymerization was conducted in the same manner as in Example 1 except changing the polymerization temperature, polymerization conversion and the amount of n-dodecylmercaptan to obtain the polymer latex shown in Table 1.

The compiled results are shown in Table 1.

TABLE 1

| | | Example 1 | Example 2 | Example 3 | Example 4 | Example 5 | Comparative Ex. 1 |
|---|---|---|---|---|---|---|---|
| Conditions for polymerization | Polymerization Temperature (° C.) | 10 | 10 | 20 | 15 | 30 | 10 |
| | Chain transfer agent (parts by mass) | 0.10 | 0.15 | 0.20 | 0.09 | 0.10 | 0.07 |
| | Polymerization conversion % | 79 | 66 | 70 | 74 | 76 | 60 |
| Results of physical property tests | Solid content concentration of latex (%) | 50 | 44 | 45 | 48 | 48 | 39 |
| | Gel content (%) | 0 | 0 | 0 | 0.5 | 0 | 7 |
| | Weight average molecular weight of soluble content | 770000 | 670000 | 560000 | 890000 | 840000 | 1050000 |
| | Molecular weight distribution of soluble content (Mw/Mn) | 2.5 | 2.2 | 2.4 | 2.6 | 2.9 | 3.3 |
| | Crystallization rate R (min.) | 35 | 32 | 46 | 38 | 55 | 38 |
| | Open time (hour) | 2.8 | 3.6 | 4.2 | 3.1 | 4.8 | 1.6 |
| | Initial peel strength (kN/m) | 4.1 | 3.8 | 3.4 | 3.6 | 3.1 | 4.8 |
| | Normal state peel strength (kN/m) | 4.4 | 4.7 | 4.2 | 4.1 | 3.4 | 5.3 |
| | Water-resistant adhesive property (kN/m) | 3.9 | 4.2 | 3.8 | 3.9 | 3.0 | 2.9 |
| | Heat resistance (° C.) | 80 | 72 | 65 | 75 | 61 | 92 |

| | | Comparative Ex. 2 | Comparative Ex. 3 | Comparative Ex. 4 | Comparative Ex. 5 |
|---|---|---|---|---|---|
| Conditions for polymerization | Polymerization Temperature (° C.) | 40 | 45 | 10 | 35 |
| | Chain transfer agent (parts by mass) | 0.20 | 0.05 | 0.02 | 0.20 |
| | Polymerization conversion % | 74 | 90 | 85 | 90 |
| Results of physical property tests | Solid content concentration of latex (%) | 47 | 52 | 51 | 48 |
| | Gel content (%) | 0 | 65 | 72 | 2 |
| | Weight average molecular weight of soluble content | 450000 | 1120000 | 1250000 | 950000 |
| | Molecular weight distribution of soluble content (Mw/Mn) | 2.1 | 3.8 | 4.5 | 4.8 |
| | Crystallization rate R (min.) | 220 | 3100 | 40 | 95 |
| | Open time (hour) | 8.8 | 2.8 | 1.1 | 1.8 |
| | Initial peel strength (kN/m) | 2.5 | 1.3 | 5.1 | 2.7 |

TABLE 1-continued

| | | | | |
|---|---|---|---|---|
| Normal state peel strength (kN/m) | 3.2 | 2.1 | 6.8 | 2.5 |
| Water-resistant adhesive property (kN/m) | 2.4 | 0.9 | 2.5 | 1.9 |
| Heat resistance (° C.) | 45 | 89 | 118 | 62 |

Industrial Applicability

As discussed above, the present invention enables to obtain a chloroprene polymer latex for adhesives having heat resistance of 60° C. or higher and excellent balance among the initial bond strength, contact adhesion and water resistance. Particularly, the latex of a chloroprene polymer is suitable for use in bonding the adherends to each other, at least one of which is a flexible material, for example, for the adhesives to bond pieces of polyurethane foam to each other, or a piece of polyurethane foam and a wood or cloth material for use in the furniture.

The invention claimed is:

1. A chloroprene polymer latex mainly comprising 2-chloro-1,3-butadiene as a monomer component, wherein the gel content in the solid of the polymer latex is 1 mass % or less; and the weight average molecular weight of the components soluble in tetrahydrofuran is from 700,000 to 1,100,000 and the molecular weight distribution (Mw/Mn) is within the range of from 2.3 to 2.8; and the crystallization rate represented by R is less than 60 minutes, wherein R indicates the hardness increase of the dried solid content of the polymer latex at −10° C. (R is the time required for initial hardness (time =0) to increase by 30 points at −10° C. as measured according to Japanese Industrial Standard JIS K-6301).

2. The chloroprene polymer latex as claimed in claim 1, containing an anionic emulsifying agent and having a pH in the range of from 10 to 13.5.

3. The chloroprene polymer latex as claimed in claim 1, further containing an acid acceptor of 0.01 to 5 parts by mass and an antioxidant of 0.1 to 3 parts by mass to 100 parts by mass of the solid content of the chloroprene polymer latex.

4. The chloroprene polymer latex as claimed in claim 3, wherein the antioxidant is a phenol antioxidant.

5. The chloroprene polymer latex as claimed in claim 3, wherein the acid acceptor is zinc oxide or hydrotalcite and the antioxidant is hindered phenol.

6. The chloroprene polymer latex as claimed in claim 1, wherein the open time is two hours or more, the initial bond strength is 3 kN/m or more and the heat-resistance of 60 ° C. or higher.

7. An adhesive characterized in comprising the chloroprene polymer latex as claimed in claim 1.

8. The adhesive as claimed in claim 7 for water-absorbing adherends.

9. A process for producing a chloroprene polymer latex mainly comprising 2-chloro-1,3-butadiene as a monomer component, characterized in that the polymerization is performed at a temperature from 0 to 30 ° C. so as to adjust the gel content in the solid content of the polymer latex to 1 mass % or less, the weight average molecular weight of the components soluble in tetrahydrofuran to a range from 700,000 to 1,100,000 and the molecular weight distribution (Mw/Mn) to the range of from 2.3 to 2.8, wherein the polymerization is performed at a polymerization conversion of from 65% to less than 80%.

10. The process for producing the chloroprene polymer latex as claimed in claim 9, wherein the polymerization is an emulsion polymerization.

11. The process for producing the chloroprene polymer latex as claimed in claim 9, wherein the polymerization conversion from 70% to less than 80%.

* * * * *